United States Patent [19]

Kobayashi et al.

[11] Patent Number: 5,276,353

[45] Date of Patent: Jan. 4, 1994

[54] SPEED STABILIZATION APPARATUS FOR TWO SHAFT GAS TURBINE

[75] Inventors: Toshimitsu Kobayashi; Koji Oda, both of Yokohama; Athusi Saigusa, Tokyo, all of Japan

[73] Assignee: Ebara Corporation, Tokyo, Japan

[21] Appl. No.: 931,422

[22] Filed: Aug. 24, 1992

Related U.S. Application Data

[63] Continuation of Ser. No. 626,600, Dec. 12, 1990, abandoned.

[51] Int. Cl.$^5$ .......................... F02C 9/00; G05D 13/00
[52] U.S. Cl. .................. 290/40 C; 290/40 B; 290/51; 322/18
[58] Field of Search .......................................... 290/40

[56] References Cited

U.S. PATENT DOCUMENTS 4,184,083  1/1980  Takeuchi ........................ 290/40 C
4,185,203  1/1980  Takeuchi ........................ 290/40 C

*Primary Examiner*—A. D. Pellinen
*Assistant Examiner*—Robert Lloyd Hoover
*Attorney, Agent, or Firm*—Armstrong, Westerman, Hattori, McLeland & Naughton

[57] ABSTRACT

A speed stabilization apparatus for use in a two shaft gas turbine is disclosed which includes a speed detector for detecting a rotational speed of a driving shaft of a turbine for driving a generator, a governer for controlling the amount of fuel supplied to a cumbustor, a plurality of delay circuits for providing load charging delay signals after predetermined time periods from when load charging commands are generated, and a forcible fuel supply control circuit. The governer usually controls the amount of fuel to the combustor in accordance with the detected speed signal from the detector so as to stabilize a rotational speed of the generator. When a load charging command is generated, the forcible fuel supply control circuit causes the governer controlling such that the full amount of fuel in supplied to the combustor. After the predetermined time duration from that, the corresponding charging load is connected to an output of the generator.

15 Claims, 7 Drawing Sheets

SPEED STABILIZATION APPARATUS FOR TWO SHAFT GAS TURBINE

This application is a continuation of application Ser. No. 626,600 filed Dec. 12, 1990 now abandoned.

BACKGROUND OF THE INVENTION

1. Field of the Invention:

The present invention relates to a speed stabilization apparatus for use in a two shaft gas turbine, and more particularly to a speed stabilization apparatus for use in a two shaft gas turbine which can improve load charging dip characteristics; that is a momentarily reduction of a rotational speed of a generator when a charging load is additionally connected to an output of the generator.

2. Description of Prior Art:

A well-known two shaft gas turbine employs a compressor driving shaft connected to a compressor driving turbine for driving a compressor, and a load driving shaft connected to an output turbine for driving a generator which is a load of the turbine, wherein these shafts are driven independently. Such a two shaft gas turbine usually incorporates a governer as a speed stabilization means. The governor is so designed that it responds to a rotational speed signal representing a rotational speed of the load driving shaft, and opens a fuel valve by a suitable degree when the rotational speed of the load driving shaft is lowered, so as to increase the amount of combustion gas supplied to the turbine from a combustor thereby causing an increase in the speed of the turbine, while when the rotational speed of the load driving shaft is increased it closes the fuel valve by a suitable degree so as to reduce the amount of combustion gas, thereby causing a decrease in the speed of the turbine. In this manner, the governer can stabilize the variation of the rotational speed of the generator resulting from a change in the electrical load to be connected to an output of the generator, and hence the output frequency of the generator can be stabilized.

According to the generator driven by the two shaft turbine provided with a speed stabilization apparatus comprised of the conventional governor mentioned above, since the compressor driving shaft is in principle independent of the load driving shaft, if a basic load normally charged to the generator is light, the compressor driven by the compressor driving shaft is caused to rotate at a speed much below that of the output turbine for the generator driven by the load driving shaft the speed of which is directly regulated by the governer so that the rotational speed of the generator is maintained at a level equal to that of the generator charged a rated load, whereby a highly efficient operation may be ensured at the time of light loading.

Conversely, when a large amount of load is additionally charged to the light basic load, the governer is activated to regulate the speed in response to the reduction of the rotational speed of the load driving shaft. In this case, since the compressor is rotated at a low speed and little air is supplied from the compressor to the combustor, even if the fuel valve is opened quickly, the combustion gas will not be actively supplied from the combustor so quickly. Thus, the rotational speed of the load driving shaft cannot be immediately returned to the previous higher speed and as a consequence a load charging dip may be caused in the rotational speed at the time of high load charging.

It is conceivable, in order to solve this load charging dip problem, to employ a single shaft gas turbine adapted to drive a compressor and a generator with one shaft. According to the monoaxial gas turbine, since the compressor is driven by the same driving shaft the rotational speed of which is governed to be at a constant and fixed speed even against a light basic load, and thus the compressor will not rotate at a reduced rotational speed at the time of light loading, an immediate response of the compressor may be secured and no or little load charging dip will be experienced. On the contrary, however, a high efficiency under a light basic load or partial load charging, cannot be anticipated. In view of the contradictory problems in terms of immediate response and high efficiency with regard to the two shaft gas turbine and the monoaxial gas turbine, there has been a demand for a speed stabilization apparatus for a two shaft gas turbine which is capable of simultaneously solving both the above problems.

SUMMARY OF THE INVENTION

It is an object of this invention to provide a speed stabilization apparatus for use in a two shaft gas turbine which avoids a load charging dip even when an excessive load is charged on a light normal basic load.

This object is achieved by a speed stabilization apparatus for a two shaft gas turbine comprising; means for delay-charging loads by predetermined time durations when load charging command signals for the respective charging loads are generated, and means for supplying a signal to a governer to forcibly and fully open a fuel valve for a predetermined period in response to the generation of the respective load charging command signals.

DETAILED DESCRIPTION OF THE PREFERRED EMBODIMENTS

Figure 1:
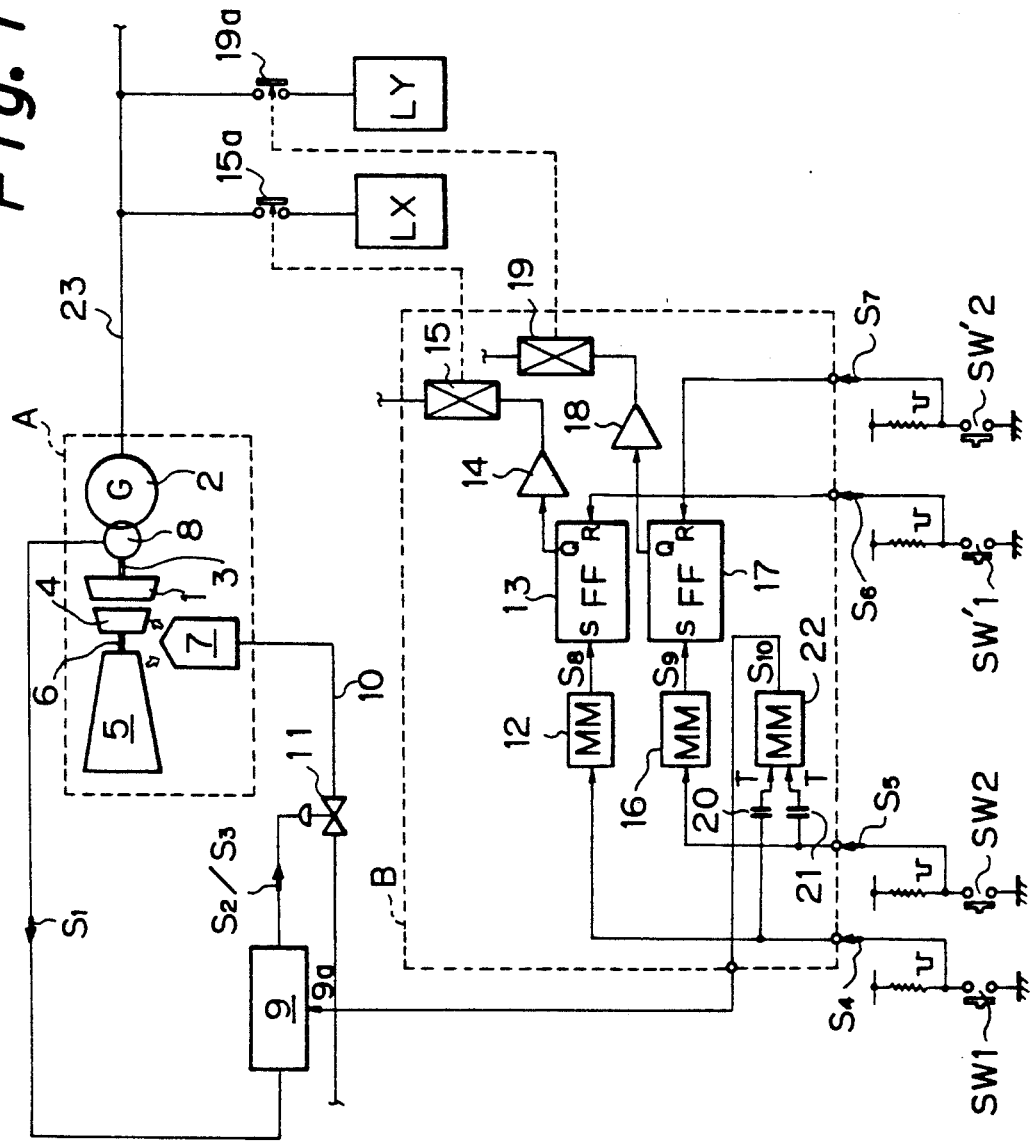
FIG. 1 illustrates in block diagram form an embodiment of the present invention.

Referring now to FIG. 1, there is shown in block form an embodiment of this invention. In FIG. 1, a two shaft gas turbine unit A is provided with a load driving shaft 3 connected to an output turbine 1 to drive a generator 2 as a load of the turbine 1, and with a compressor driving shaft 6 connected to a compressor driving turbine 4 to drive a compressor 5. These shafts 3 and 6 are independently rotated by the respective turbines 1 and 4. A combustor 7 incorporated in the turbine unit A adjacent to the compressor driving turbine 4 is supplied with air from the compressor 5 and provides a combustion gas to the output turbine 1 through the compressor driving turbine 4. The load driving shaft 3 is also connected to a rotational speed detecting module 8, such as a tacho-generator driven with the generator 2, an electro-magnetic pick-up, or the like.

The rotational speed detecting module 8 detects a rotational speed of the load driving shaft 3 and provides a rotational speed signal $S_1$ to a governer 9. The governer 9, in turn, supplies a normal valve control signal $S_2$ to a fuel valve 11 in response to the received signal $S_1$, or rotational speed of the shaft 3. The valve is disposed at a fuel supply pipe 10 extending to the combustor 7, and is controlled to be opened and closed by suitable degrees in accordance with the valve control signal $S_2$.

In the unit A, the combustor 7 is supplied with air from the compressor 5 and the fuel delivered via the fuel supply pipe 10 is combusted therein, whereby the combustion gas is supplied through the compressor driving turbine 4 to the output turbine 1. In this way, the generator 2 and the compressor 5 are driven by the two independent driving shafts 3 and 6 at different rotational speeds.

In this instance, when the rotational speed of the generator 2 is lowered due to the increase of electric charging loads, the rotational speed signal $S_1$ from the tacho-generator 8 will be correspondingly reduced, so that the governer 9, in response thereto, will output the valve control signal $S_2$ to cause the fuel valve 11 to be opened. Accordingly, the rotational speed of the generator 2 may be restored to the previous level. Conversely, when the rotational speed of the generator 2 is increased due to reduction of the electric charging loads, a reverse operation to the afore-said operation will be executed, so as to restore the rotational speed of the generator 2 to the previous level. Accordingly the rotational speed of the generator 2 may be stabilized.

The above-mentioned two shaft gas turbine unit A with the governer 9 and their cooperation are well known.

In FIG. 1, a load charging dip restriction unit B includes mono-stable multi-vibrators 12 and 16, as load charging delay means, input terminals of which are connected to receive signals $S_4$ and $S_5$ generated by momentarily turning on load charging command switches SW1 and SW2, R-S flip-flops 13 and 17, the set terminals (S) of which are respectively connected to receive output signals $S_8$ and $S_9$ from the multi-vibrators 12 and 16 and reset terminals (R) of which are respectively connected to receive signals $S_6$ and $S_7$ generated by turning-on load release command switches SW'1 and SW'2, and relays 15 and 19 connected to receive output signals from the positive phase output terminals (Q) of the flip-flops 13 and 17 through buffer amplifiers 14 and 18. The multi-vibrator 12, flip-flop 13 and relay 15 constitute load charging delay means for charging load LX, while the multi-vibrator 16, flip-flop 17 and relay 19 constitute load charging delay means for charging load LY.

The relays 15 and 19 have make contacts, or normally-open contacts 15a and 19a connected between and output bus 23 of the generator 2 and the charging loads LX and LY.

The dip restriction unit B further includes a mono-stable multivibrator 22 as valve forcible opening command means, which receives trigger signals through capacitors 20 and 21 when the respective switches SW1 and SW2 are closed, and outputs a valve forcible opening command signal $S_{10}$ to an interrupt control terminal 9a of the governer 9.

In this embodied unit B, the multi-vibrators 12, 16 and 22 are triggered at falling edges of their input pulses and their output signals $S_8$, $S_9$ and $S_{10}$ then change signal levels for time periods T1X, T1Y and T2. The flip-flops 13 and 17 are triggered at rising edges of their input signals.

Figure 2:
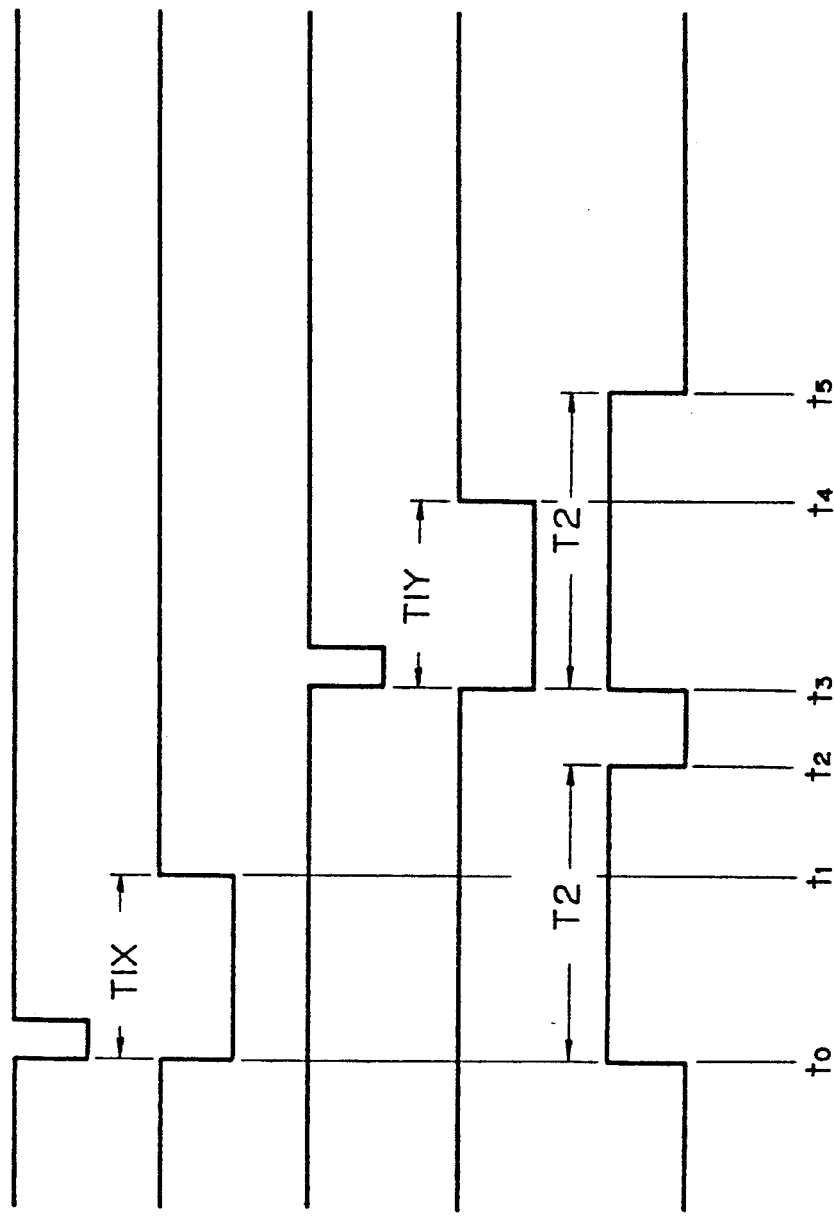
FIGS. 2(A)-2(E) show wave forms of signals at the essential parts in the embodiment shown in FIG. 1.

Operation of the apparatus shown in FIG. 1 will next be explained by referring to FIG. 2.

Assuming both of the charging loads LX and LY to have been disconnected. Since the switches SW1, SW2, SW'1 and SW'2 are normally open types, the levels of the signals $S_4$ through $S_7$ are normally high.

When the switch SW1 is turned-on ($t=t_0$), the signal $S_4$ becomes the earth level as shown in FIG. 2(A) and thereby the multi-vibrator 12 is changed to the metastable (quasi-stable) condition so that its output signal $S_8$ drops to a low level as shown in FIG. 2(B). When the time duration T1X, which is set at the multi-vibrator 12 to stipulate a delay time for delay-charging the load LX, passes away ($t=t_1$), the multi-vibrator 12 returns again to the stable condition, and in turn the flip-flop 13 which has been at a low level up to this time is set to output the high level from the Q terminal. This high level signal is then amplified by the buffer amplifier 14, whereby the relay 15 is energized at the time $t_1$ to close the make contact 15a. Accordingly, the load LX is connected to the bus 23 to be supplied with power from the generator 2.

At $t=t_0$, the multi-vibrator 22 also receives through the capacitor 20 a trigger pulse, which is generated by operation the switch SW1, to change its output signal $S_{10}$ to the high level during the time period T2, which has been set thereat and is longer than the time period T1X set at the multi-vibrator 12, as shown in FIG. 2(E). The high level signal from the multi-vibrator 22 is then supplied to the interrupt control terminal 9a of the governer 9, thereby the governer 9 preferentially provides a forcible opening valve control signal $S_3$ to the fuel valve 11 during the time period T2 by interrupting the normal valve control signal $S_2$. In other words, the forcible opening valve signal is directly supplied through the governor 9 to the fuel valve 11, whereby the valve 11 is kept in a fully opened condition throughout the time period T2 (from $t_0$ to $t_2$).

Eventually, if the charging load LX is to be charged, the load LX will be charged at the time delayed by the time duration T1X subsequent to the command operation for the load charging, and the fuel valve will be kept in the fully opened condition during the time duration T2 longer than the time duration T1X. Accordingly, since the load LX is charged after the compressor driving turbine 4 and hence the compressor 5 have attained an adequate rotational speed owing to the gas supplied from the combustor 7 activated by the fuel supplied via the fully opened fuel valve 11 during the load charging delay time period T1X, and the fuel valve 11 is continuously kept in the fully opened condition for the time period (time=T2-TX1) after the load LX is charged, the dip of the rotational speed of the generator at the time of or immediately after charging of the load may be restricted.

When the operation switch SW2 is turned-on ($t=t_3$) so as to charge the load LY, the command signal $S_5$ is supplied to the multi-vibrator 16, as shown in FIG. 2(C). After the lapse of the period T1Y, at $t=t_4$, the flip-flop 17 is reversed to the set condition by the signal S9 shown in FIG. 2(D) from the multivibrator 16, to output the high level signal, so that the relay 19 is activated to connect the load LY to the output bus 23 of the generator 2 by way of the make contact 19a.

At $t=t_3$, the multivibrator 22, which returned to the normal condition at $t=t_2$, receives a trigger pulse from the switch SW2 through the capacitor 21 to change the output signal $S_{10}$ to high and maintain the high level during the time period T2 as shown in FIG. 2(E). Accordingly, in the similar manner to the case of the charging of the load LX, the forcible opening valve signal $S_3$ is supplied to the valve 11 to fully open it again from $t_3$ to $t_5$.

In the above state, when the load releasing switch SW'1 or SW'2 is momentarily turned-on, the load releasing command signal $S_6$ or $S_7$ is provided to the reset terminal (R) of the flip-flop 13 or 17 to change its output to the low level. The relay 15 or 19 is thus disenergized and then the load LX or LY is disengaged from the power supply bus 23.

Figure 3:
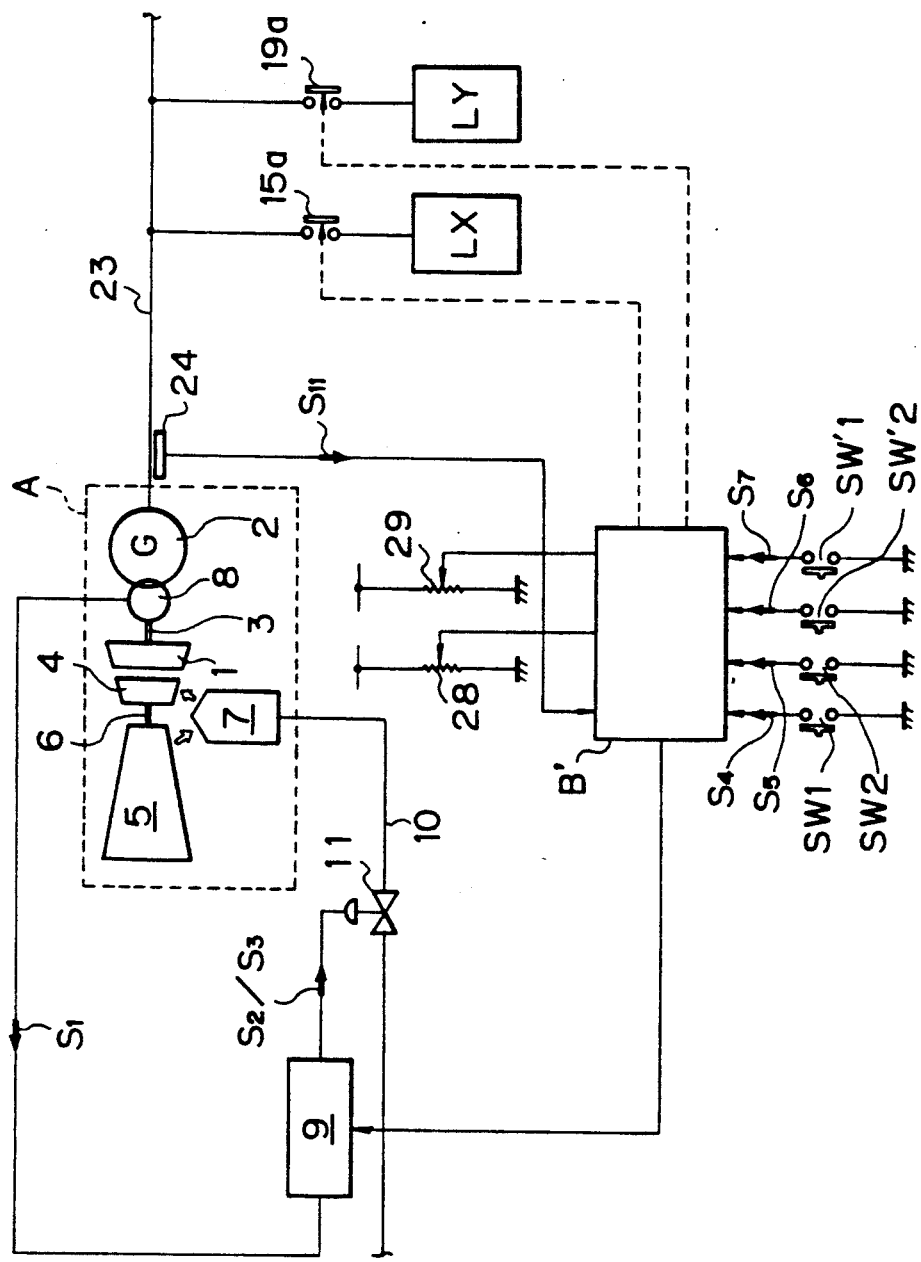
FIG. 3 illustrates a second embodiment of the present invention.

FIG. 3 illustrates another embodiment of this invention, wherein a basic load measuring sensor 24 and two potentiometers 28 and 29 are additionally incorporated into the first embodiment shown in FIG. 1 and the constitution of a load charging dip restriction unit B' is different from that of the unit B of the first embodiment. The other elements are the same as those designated by the same symbols in FIG. 1. The basic load measuring sensor 24 comprises a current transformer and a current detector to detect a current flowing through the output bus 23 and provides an output signal $S_{11}$, corresponding to the detected current value of the basic load, to the unit B'. The potentiometers 28 and 29 are respectively set to output predetermined reference voltages $V_{ref1}$ and $V_{ref2}$ and these voltages are provided to the dip restriction unit B'. These voltages are set in accordance with the load values of the charging loads LX and LY.

Figure 4:
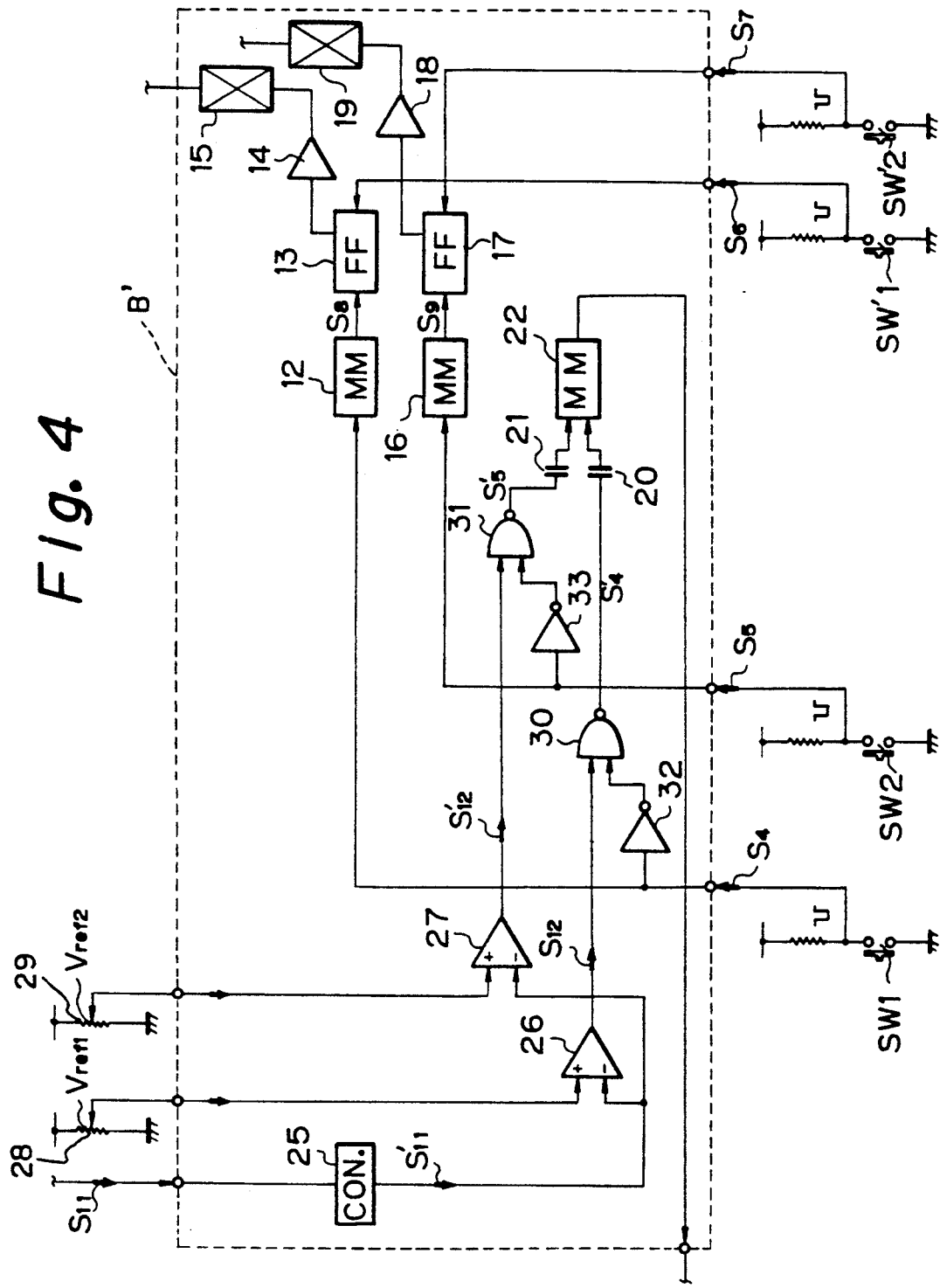
FIG. 4 is a block diagram showing the internal constitution of the load charging dip restriction unit B' in the second embodiment shown in FIG. 3.

FIG. 4 shows an internal constitution of the unit B', wherein the same elements as in FIG. 1 are designated by the same reference symbols. In this unit B', a signal conditioning circuit 25 is connected to receive the signal $S_{11}$ output from the basic load measuring sensor 24 and provides an output signal $S'_{11}$ to input terminals of comparators 26 and 27, the other input terminals of which are respectively provided with the reference voltages $V_{ref1}$ and $V_{ref2}$ from the potentiometers 28 and 29.

Output terminals of the comparators are respectively connected to input terminals of NAND gates 30 and 31, the other input terminals of which are connected to the load charging command switches SW1 and SW2 through inverters 32 and 33 respectively, and output terminals of which are connected to the multi-vibrator 22 via the respective capacitors 20 and 21.

Operation of the second embodiment will be described by referring to FIGS. 5(A) through 5(G)

In the similar manner to the first embodiment, when the switch SW1 or SW2 is momentarily closed, the load LX or LY is supplied with power from the generator 2 through the bus 23 after the time duration T1X or T1Y, and when the switch SW'1 or SW'2 is turned-on, the load LX or LY is immediately disconnected from the bus 23.

Considering that the switch SW1 is closed, the low level signal $S_4$ is inverted by the inverter 32 and then the NAND gate 30 receives the high level signal from the inverter, whereby the gate 30 can inversely transmit a signal $S_{12}$ from the comparator 26 only when the switch SW1 is closed. The potentiometer 28 has been set to provide the reference voltage $V_{ref1}$ so as to correspond the resistance value of the load or a value proportional thereto (typically, the rate percentage of the resistance value of the load LX to the summing resistance value of the whole loads to be connected to the bus 23), while the signal conditioning circuit 25 generates the signal $S'_{11}$ having a DC voltage corresponding to the resistance value of the basic load or a value proportional thereto (typically, the rate percentage of the resistance value of the basic load to the summing resistance value of the whole loads), obtained by signal-conditioning the signal $S_{11}$ output from the basic load measuring sensor 24.

The level of the signal $S'_{11}$ generated from the circuit 25 is compared with the reference voltage $V_{ref1}$ at the comparator 26, and if the latter ($V_{ref1}$) is larger than the former ($S'_{11}$), that is, the charging load LX is considerably larger than the normal basic load with respect to their resistance values, the signal $S_{12}$ output from the comparator 26 is the high level. The NAND gate 30, which also receives the high level signal from the inverter 32 at $t=t_0$, then outputs a signal $S'_4$ having the low level (not shown in FIG. 5(C)) to the multi-vibrator 22 through the capacitor 20, whereby the vibrator 22 changes its output signal $S_{10}$ to high during the time period T2. Accordingly, the forcible opening valve control signal $S_3$ is directly provided through the governer 9 to the valve 11 to fully open it, in the similar manner to the first embodiment.

Figure 5:
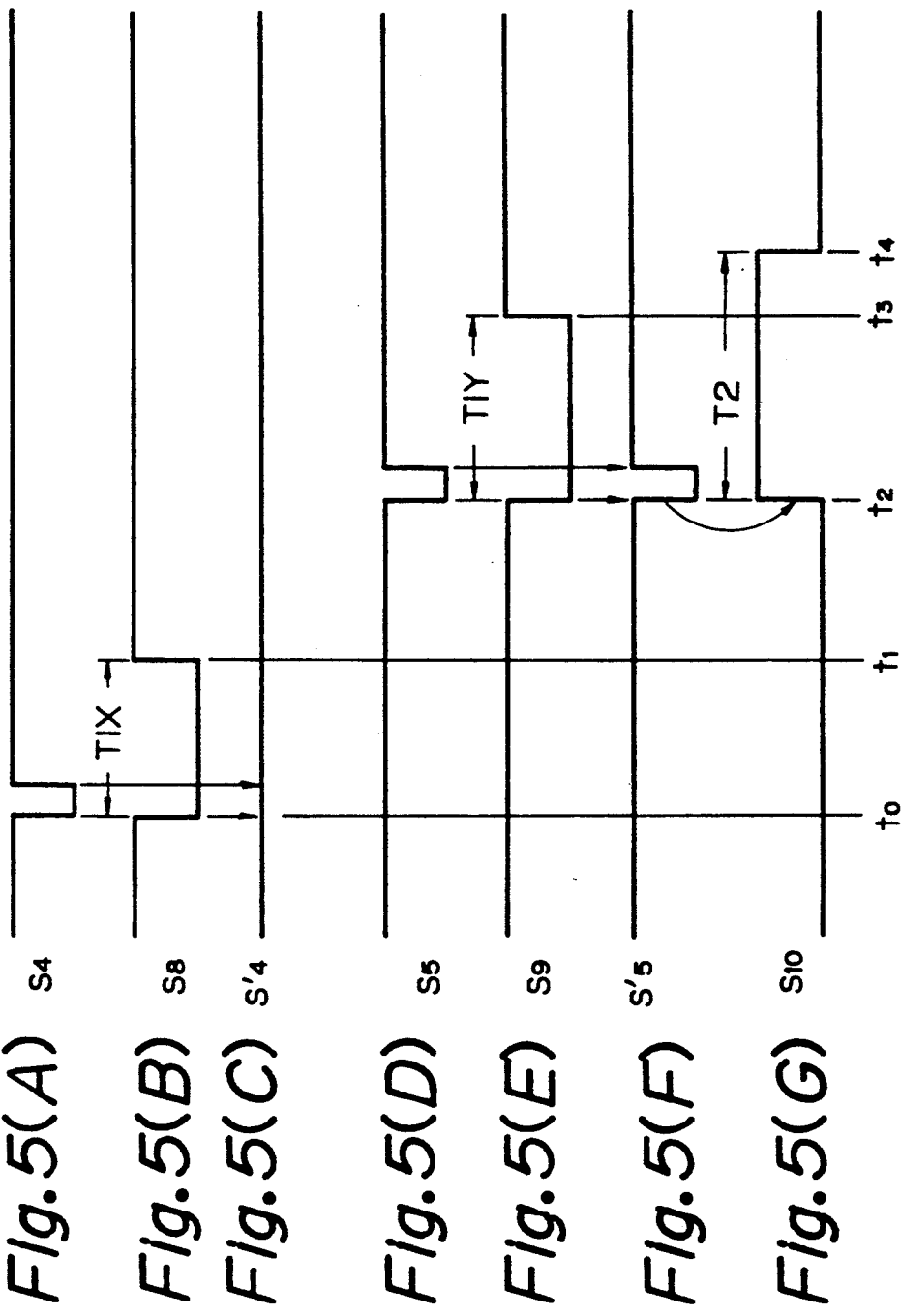
FIGS. 5(A)-5(G) show wave forms of signals at the essential parts in the dip restriction unit B' shown in FIG. 4.

Conversely, if the reference voltage $V_{ref1}$ is smaller than the signal $S'_{11}$, the signal $S_{12}$ output from the comparator 26 is low and then the NAND gate 30 maintains the high level of the signal $S'_4$ as shown in FIG. 5(C) even when the switch SW1 is closed at $t=t_0$. Therefore, the multi-vibrator 22 is not triggered and thus the forcible opening valve control signal $S_3$ is not supplied through the governor 9 to the valve 11.

Similarly, when the command switch SW2 is momentarily closed as shown in FIG. 5(D), and only when the signal $S'_{11}$ generated from the conditioning circuit 25 is smaller than the reference voltage $V_{ref2}$ set at the potentiometer 29, the forcible-opening valve signal $S_3$ is directly provided through the govenor 9 to the valve during the time period T2 which is the metastable time period of the multi-vibrator 22 (shown in FIG. 5(G)).

Figure 6:
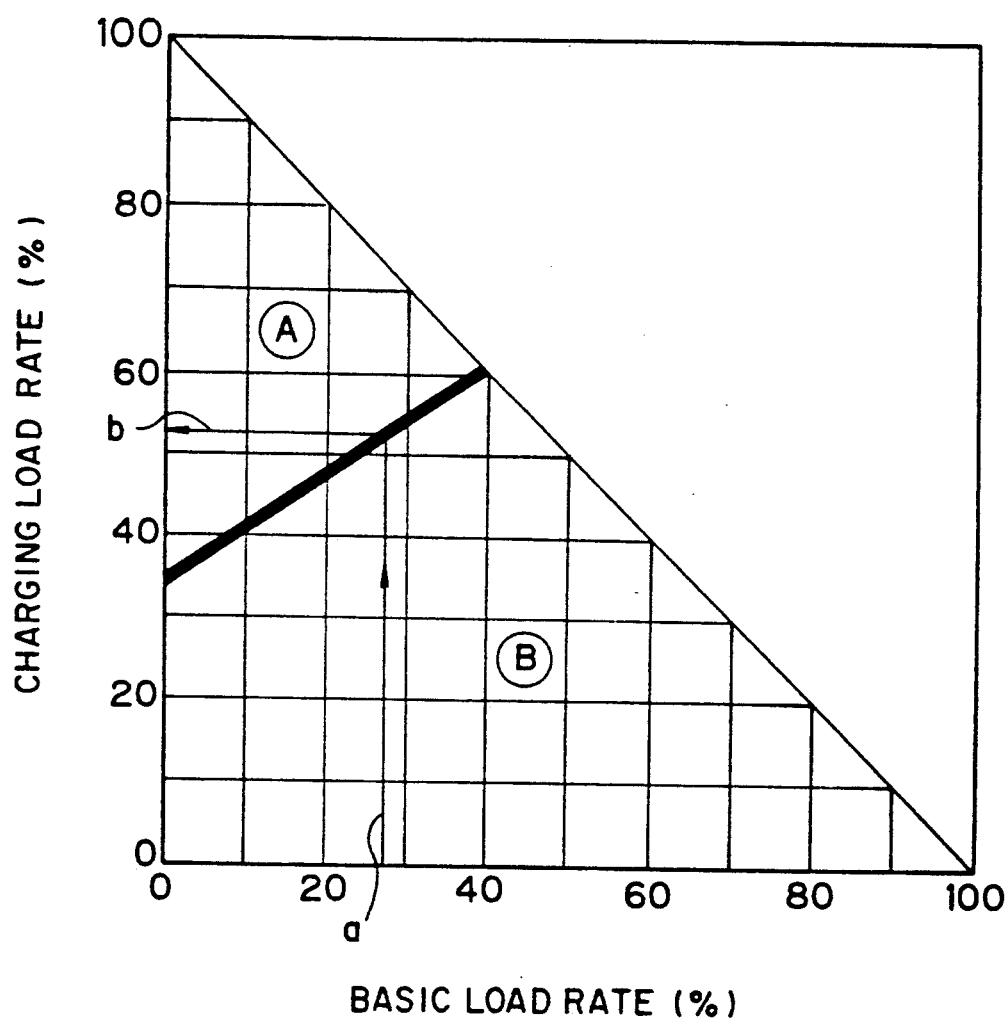
FIG. 6 shows a characteristic diagram showing a decision criterion with regard to a signal comparison operation for deciding whether or not a fuel valve should be forcibly and fully opened when a load is additionally charged.

FIG. 6 illustrates a graph showing a criterion of deciding the signal comparison operation in respect of the basic load rate percentage and the charging load rate percentage. In the graph, the abscissa represents the former and the ordinate represents the latter.

In the graph, assuming the basic load rate to be 27% as designated by the auxiliary line a in the vertical direction, the critical charging load rate at which the valve should be forcibly opened is 53% as designated by the lateral auxiliary line b. Accordingly, the combinations of the basic load rate and the charging load rate which define the area A in the graph will need to stabilize the rotational speed by forcibly opening the fuel valve, while the combinations thereof which define the area B in the graph may be supposed to cause a slight dip due to the load charging and thus a normal governing operation may provide a stable speed without applying the forcible opening valve means.

Although the boundary line between the areas A and B may be different depending on individual situations, a desired boundary line may be realized to a reasonable extent by setting the reference voltages at the potentiometers 28 and 29 in accordance with such situations.

Figure 7:
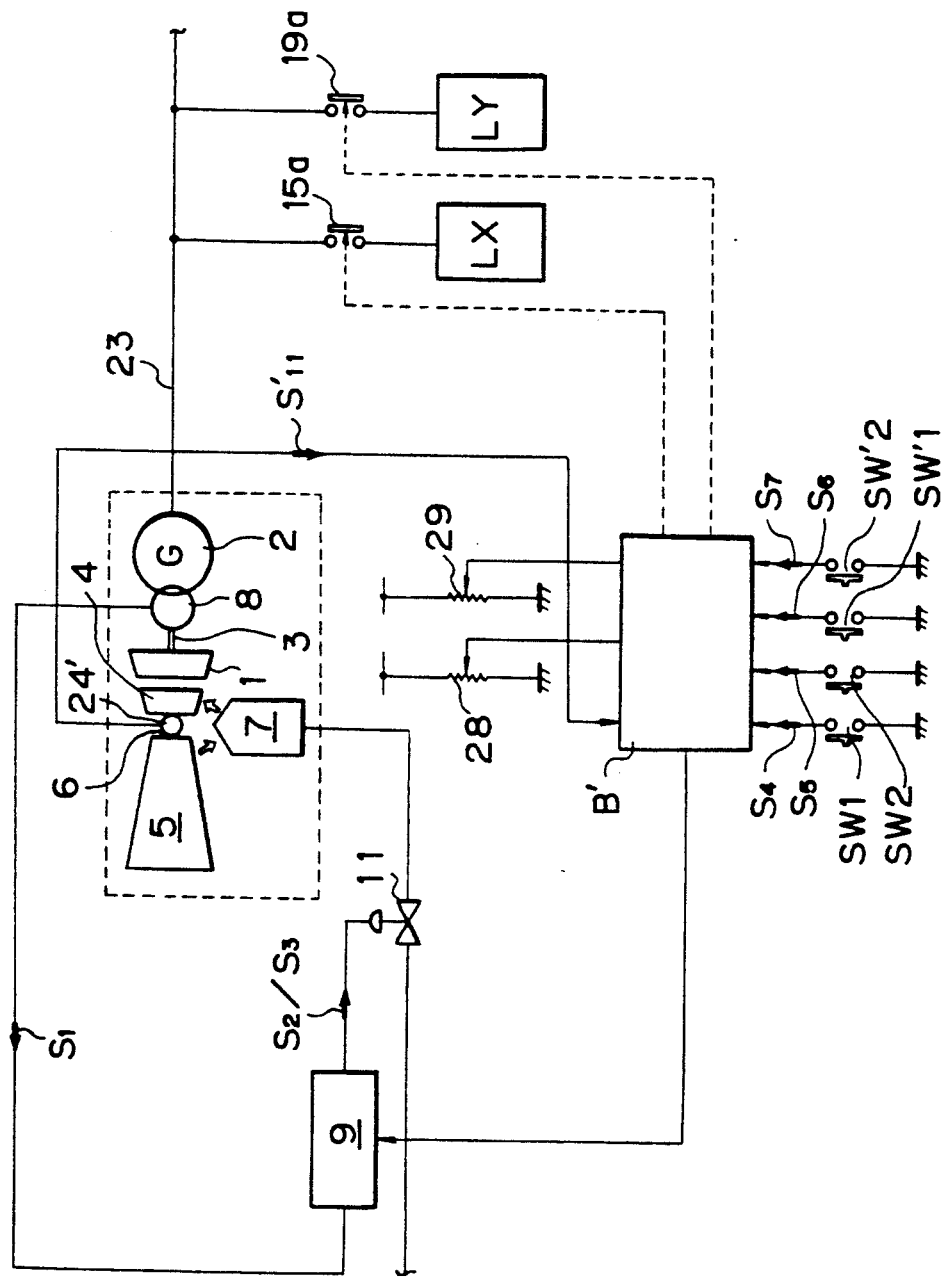
FIG. 7 illustrates a third embodiment of the present invention.

FIG. 7 shows an embodiment alternative to the second embodiment shown in FIG. 3. In this third embodiment, in place of the basic load measuring sensor 24, a compressor rotational speed measuring sensor 24' for detecting the rotational speed of the compressor 5 is imposed at the rotational shaft 5 for driving the compressor. Further, in this embodiment, the potentiometers 28 and 29 are set specified constant values corresponding to threshold rotational speeds of the compressor for the respective charging loads instead of the charging load value or its corresponding value as set in the second embodiment. Accordingly, so long as the compressor 5 is driven at a low rotational speed blows the specified threshold rotational speed with a light load charging, the generator 2 may be stabilized by forcibly opening the fuel valve 11.

In the embodiments described above, since the monostable multi-vibrators 12, 16, and 22 are employed as time duration signal generating means, it is obvious to use any other circuits, for example delay circuits operable to output such signals in response to any trigger signals.

Having described specific embodiments of our invention, it is believed obvious that modification and variation of our invention is possible in light of the above teachings.

What is claimed is:

1. In a speed stabilization apparatus for stabilizing a rotational speed of a two shaft gas turbine system including a generator, a load driving shaft coupled with an output turbine for driving said generator, a compressor, a compressor driving shaft coupled with a compressor driving turbine for rotating said compressor, and a combustor adapted to be supplied with fuel through a fuel pipe having a fuel valve and air from said compressor for supplying fuel gas through said compressor driving turbine to said output turbine, said stabilization apparatus comprising rotational speed detection means for detecting a rotational speed of said load driving shaft to provide a rotational speed signal and governor means in response to said rotational speed signal for stabilizing the rotational speed of said load driving shaft by opening said fuel valve when the rotational speed of said load driving shaft is decreased and by closing said fuel valve when the rotational speed of said load driving shaft is increased, the improvement comprising a load charging dip restriction unit including:

load charging delay time counting means in response to a load charging command to count a load charging delay time;

charging load connecting and releasing means for connecting a charging load to said generator when the load charging delay time has been counted and in response to a load disconnecting command for releasing the charging load from said generator;

charging load presetting means for presetting a charging load to produce a charging load signal proportionally representing a preset charging load;

basic load measurement means for measuring a basic load on the basis of an electric output of said generator to produce a basic load signal representing a basic load;

forcible opening valve control means for producing a forcible opening valve signal when the charging load signal is larger than the basic load signal as a result of a comparison between the charging load signal and the basic load signal; and forcible opening valve means in response to the load charging command only when the forcible opening valve control signal is output for directly supplying a forcible opening valve signal through said governor means to said fuel valve so as to forcibly open said fuel valve during a forcible opening valve period.

2. A restriction unit according to claim 1, wherein said load charging delay time counting means comprises a first monostable multivibrator connected to receive the load charging command and having a first predetermined metastable time period.

3. A restriction unit according to claim 2, wherein said charging load connecting and releasing means comprises a flip-flop connected to receive the output of said first monostable multivibrator and a switching means connected to receive the output of said flip-flop for connecting said charging load to said generator.

4. A restriction unit according to claim 3, wherein said flip-flop is connected to receive the load disconnecting command and causes said switching means to disconnect said charging load from said generator when said flip-flop receives the load disconnecting command.

5. A restriction unit according to claim 1, wherein said basic load measurement means comprises a current transformer and a current detector to detect a current flowing at the output of said generator.

6. A restriction unit according to claim 1, wherein said charging load presetting means comprises a potentiometer which outputs a reference voltage.

7. A restriction unit according to claim 6, wherein forcible opening valve control means comprises a comparator, one input of which receives the reference voltage from said potentiometer and the other input of which receives the basic load signal from said basic load measurement means.

8. A restriction unit according to claim 1, wherein said forcible opening valve means comprises a second monostable multivibrator which remains in a metastable condition for a second predetermined time period in response to the load charging command, the second predetermined time period corresponding to the forcible opening valve period.

9. A speed stabilization apparatus for stabilizing a rotational speed of a two shaft gas turbine system including a generator, a load driving shaft coupled with an output turbine for driving said generator, a compressor, a compressor driving shaft coupled with a compressor driving turbine for rotating said compressor, and a combustor adapted to be supplied with fuel through a fuel pipe having a fuel valve and air from said compressor for supplying fuel gas through said compressor driving turbine to said output turbine, said stabilization apparatus comprising first rotational speed detection means for detecting a rotational speed of said load driving shaft to provide a rotational speed signal and governor means in response to said rotational speed signal for stabilizing the rotational speed of said load driving shaft by opening said fuel valve when the rotational speed of said load driving shaft is decreased and by closing said fuel valve when the rotational speed of said load driving shaft is increased, the improvement comprising a load charging dip restriction unit including:

load charging delay time counting means in response to a load charging command to count a load charging delay time;

charging load connecting and releasing means for connecting a charging load to said generator when the load charging delay time has been counted and in response to a load disconnecting command for releasing the charging load from said generator;

presetting means for presetting a value representing a maximum rotational speed of said compressor to produce a preset speed signal;

second rotational speed detection means coupled with said compressor driving shaft to produce a compressor rotational speed signal;

forcible opening valve control means for producing a forcible opening valve signal when the preset speed signal is larger than the compressor rotational speed signal as a result of a comparison between the preset speed signal and the compressor rotational speed signal; and forcible opening valve means in response to the load charging command only when the forcible opening valve control signal is output for directly supplying a forcible opening valve signal through said governor means to said fuel valve so as to forcibly open said fuel valve during a forcible opening valve period.

10. A restriction unit according to claim 9, wherein said loading charging delay time counting means comprises a first monostable multivibrator connected to receive the load charging command and having a first predetermined metastable time period.

11. A restriction unit according to claim 10, wherein said charging load connecting and releasing means comprises a flip-flop connected to receive the output of said first monostable multivibrator and a switching means connected to receive the output of said flip-flop for connecting said charging load to said generator.

12. A restriction unit according to claim 11, wherein said flip-flop is connected to receive the load disconnecting command and causes said switching means to disconnect said charging load from said generator when said flip-flop receives the load disconnecting command.

13. A restriction unit according to claim 9, wherein said presetting means comprises a potentiometer.

14. A restriction unit according to claim 13, wherein forcible opening valve control means comprises a comparator, one input of which receives the present speed signal from said potentiometer and the other input of which receives the compressor rotational speed signal from said second rotational speed detection means.

15. A restriction unit according to claim 9, wherein said forcible opening valve means comprises a second monostable multivibrator which remains in a metastable condition for a second predetermined time period in response to the load charging command, the second predetermined time period corresponding to the forcible opening valve period.

* * * * *

UNITED STATES PATENT AND TRADEMARK OFFICE
CERTIFICATE OF CORRECTION

PATENT NO. : 5,276,353
DATED : Jan. 4, 1994
INVENTOR(S) : Toshimitsu Kobayashi, et al It is certified that error appears in the above-indentified patent and that said Letters Patent is hereby corrected as shown below:

On the title page: Item

[30] Foreign Application Priority Data:

Dec. 12, 1989 [JP] Japan .................. 1-322255

Signed and Sealed this

Sixteenth Day of August, 1994

Attest:

BRUCE LEHMAN

*Attesting Officer*     *Commissioner of Patents and Trademarks*